United States Patent
Bouyer

[19]

[11] Patent Number: 6,092,984

[45] Date of Patent: Jul. 25, 2000

[54] SYSTEM LIFE FOR CONTINUOUSLY OPERATING ENGINES

[75] Inventor: Mark J. Bouyer, Reading, Mass.

[73] Assignee: General Electric Company, Cincinnati, Ohio

[21] Appl. No.: 09/215,859

[22] Filed: Dec. 18, 1998

[51] Int. Cl.[7] .................................................... F01D 5/10
[52] U.S. Cl. ...................... 415/119; 415/148; 415/149.2; 415/149.4; 415/150; 415/159; 415/162
[58] Field of Search .................... 415/119, 159, 415/162, 148, 149.2, 149.4, 150

[56] References Cited

U.S. PATENT DOCUMENTS

| | | |
|---|---|---|
| 2,842,305 | 7/1958 | Eckenfels et al. . |
| 3,303,992 | 2/1967 | Johnson . |
| 3,314,595 | 4/1967 | Burge et al. . |
| 4,050,844 | 9/1977 | Miller et al. . |
| 4,299,534 | 11/1981 | Yamane et al. . |
| 4,773,821 | 9/1988 | Gonthier et al. . |
| 5,429,477 | 7/1995 | Sikorski et al. .................... 415/119 |
| 5,601,401 | 2/1997 | Matheny et al. . |

*Primary Examiner*—Edward K. Look
*Assistant Examiner*—Hermes Rodriguez
*Attorney, Agent, or Firm*—Andrew C. Hess; William Scott Andes

[57] ABSTRACT

A method is provided for extending the system life of variable geometry components, including variable geometry rings, in an engine system by minimizing relative motion incurred from engine vibrations. Initially, the variable geometry rings are de-tuned from resonant engine vibrations. Damping is then introduced to absorb the impact from the relative motion incurred by engine vibrations and to minimize transmission of the relative motion through the variable geometry components.

9 Claims, 4 Drawing Sheets

SYSTEM LIFE FOR CONTINUOUSLY OPERATING ENGINES

TECHNICAL FIELD

The present invention relates in general to engine operation and more particularly to a system and method for minimizing the relative motion at hardware interfaces of continuously operating engine systems.

BACKGROUND OF THE INVENTION

Multitude existing engines, such as aircraft engines, and also including automobile, marine, industrial and other engines, have multiple locations of relative motion. Relative motion exists everywhere adjacent hardware is linked with bearings or is bushed. When the engine is run continuously, even small displacements will wear at the linked or bushed interfaces. Current systems have high responses at the interfaces due to a match in natural frequencies and normal engine vibrations. Normal engine vibrations which are common to flight engines are those vibrations induced by rotating hardware Additional vibrations are unique to particular systems. For example, vibrations may be caused from natural gas fuel. Natural gas is readily available and is the fuel of choice for most operators. This phenomenon is called combustor rumble. Combustor rumble imparts energy to the variable geometry system and is absorbed and damped at the linkage bearings and bushed interfaces.

Some engines, particularly continuously operated engines, can experience fleet-wide premature wear of high pressure compressor variable geometry hardware. The system wear is responsible for several undesirable conditions, such as unscheduled downtime to replace worn hardware; loose links from worn bearings; operational problems including reduced stall margin and degraded specific fuel consumption (SFC); and stage 2 high pressure compressor shroud and blade contact.

The current replacement rate of the high pressure compressor variable geometry hardware is between 8000 and 10000 hours, which is about equal to 15 months of field service. The expected durability of the variable geometry system is about 4–5 years. Several changes have been introduced in the art to improve component durability such as improved materials, anti-rotation features on bushings and lubricants in areas of relative motion between rubbing hardware and larger bearings in the links. However, these improvements are introduced as incremental improvements to make the hardware more tolerant of the engine system vibrations.

Specific components in the variable geometry system respond at resonant frequencies from normal engine vibrations. This results in extreme relative motion at the hardware connecting interfaces and has a significant impact on the service capability of the hardware.

It is seen then that it would be desirable to have a system and method which addresses the tendency of the hardware to deteriorate from resonating at their natural frequencies.

SUMMARY OF THE INVENTION

The present invention provides for system life improvement of an engine by addressing the tendency of the hardware to deteriorate from resonating at their natural frequencies.

In accordance with one aspect of the present invention, relative motion at hardware interfaces of an engine system are minimized by detuning and damping the existing hardware from typical engine vibrations and combustor rumble.

In the drawings as hereinafter described, various embodiments are depicted; however, other modifications and alternative constructions can be made thereto without departing from the true spirit and scope of the invention.

BRIEF DESCRIPTION OF THE DRAWING

The novel features of the invention are set forth with particularity in the appended claims. The invention itself, however, both as to organization and method of operation, together with objects and advantages thereof, may best be understood by reference to the following description taken in conjunction with the accompanying drawing in which:

DETAILED DESCRIPTION OF THE INVENTION

Figure 1:
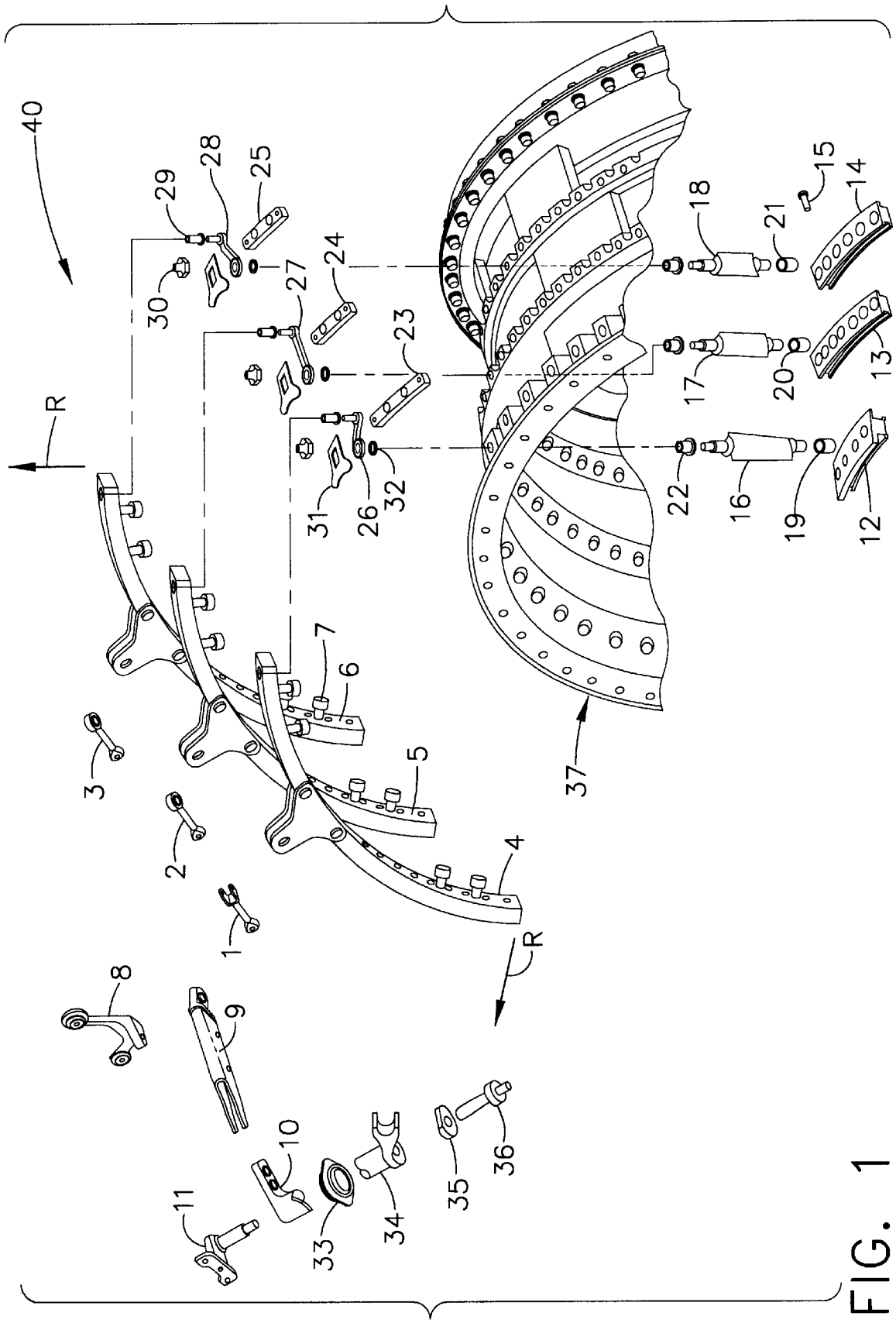
FIG. 1 is an exploded view of an engine high pressure variable geometry system, in accordance with the present invention.

The present invention proposes a system and method for minimizing the relative motion at hardware interfaces of an engine system 40, illustrated in FIG. 1. As can be seen, multiple locations exist for relative motion, everywhere adjacent hardware is linked with bearings or is bushed. For example, link 1, 2 and 3 connect unison rings 4, 5 and 6, respectively, to master lever 9. Additionally, vane spindle bushings 22 wear from rubs at the vane spindle 16, 17 and 18 and casing 37 surface. Unison ring bushings 29 wear from rubs between the lever arm pin 26, 27 and 28 and the unison ring 4, 5 and 6 surfaces. The inner shroud bushings 19, 20 and 21, shrouds 12, 13 and 14 and retaining pins 15 wear from rubs with adjacent hardware. When the engine is run continuously, even small displacements will wear at the linked or bushed interfaces.

When the system comprises a constant volume compressor, the variable geometry system adjusts the angle of the variable vanes 16, 17 and 18 to direct the airflow onto rotating airfoils (not shown). The purpose of directing the air is to maintain aerodynamic loads within the mechanical limits of the airfoil and to achieve efficiency and stall margin requirements for safe and reliable operation.

Continuing with FIG. 1, an electronically controlled actuator (not shown) positions outer bellcrank 34 to schedule the variable vanes. The outer bellcrank 34 translates the linear motion of the actuator to an angular displacement, which is converted to linear displacements at the master lever 9 and links 1, 2 and 3. The linear displacement of the links rotate the unison rings 4, 5 and 6. Lever arms 26, 27 and 28 convert the rotational displacement of the rings to an angular displacement of the variable vanes.

In accordance with the present invention, the relative motion at the hardware interfaces is minimized by de-tuning and damping the existing hardware, such as is shown in FIG. 1, from typical engine vibrations and combustor rumbles. Minimization of relative motion can be accomplished by loading the variable geometry rings 4, 5 and 6 with a force in the radial direction shown by arrow R.

Figure 2A:
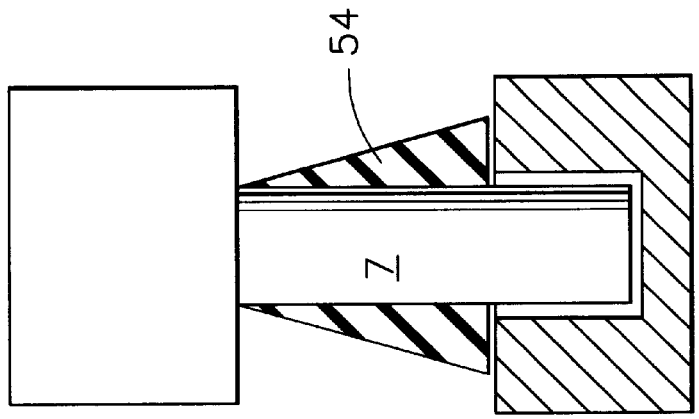
FIGS. 2A through 2H illustrate various embodiments for achieving the system life improvement of the representative structure of FIG. 1 in accordance with the present invention.

In accordance with one embodiment of the present invention, this force is achieved with a spring, for example item 50 in FIG. 2A, located between the rings 4, 5 and 6 and corresponding stand-off pads 23, 24 and 25 in FIG. 1. The springs 50 change the natural frequencies of the rings 4, 5 and 6 in FIG. 1 and provide frictional damping at the stand-off pads 23, 24 and 25 and casing 37, or can provide independent radial damping.

Figure 2B:
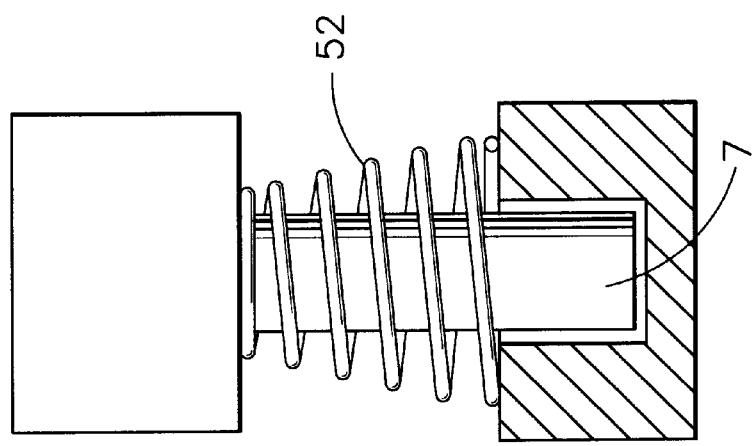

It will be obvious to those skilled in the art that various modifications can be made to the structure described thus far, without departing from the spirit and scope of the invention. For example, one alternative embodiment for minimization of relative motion by loading the variable geometry rings in the radial direction with a force, proposes a force comprised of a helical conic spring 52 disposed around a ring stud 7, as illustrated in FIG. 2B. With such a configuration, there is no interference associated with the lever arms 26, 27 and 28. Furthermore, the spring rates can be changed easily. If the spring breaks, it is contained, and the system reverts to the existing design.

An additional benefit provided by the present invention is that frictional damping at the interface between the stand-off pads 23, 24 and 25 and casing 37 in FIG. 1 results in a reduced relative motion between the rings 4, 5 and 6 in FIG. 1 and the adjacent hardware such as, for example, at the connecting links 1, 2 and 3, master lever 9, inner bellcrank 10, forward mount 11, aft mount 8, and lever arm pin bushings 29 in FIG. 1. Additionally, the benefit of damping is inherited by other components within the variable geometry system that are affected by the unison ring 4, 5 and 6 motion such as, for example, the variable vane spindle bushings 22, shroud bushings 19, 20 and 21, and retaining pins 15 as shown in FIG. 1.

Figure 2C:
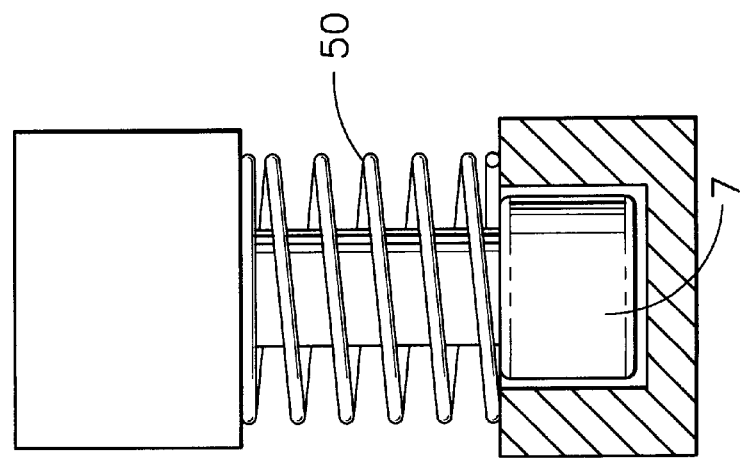

Another alternative embodiment is illustrated in FIG. 2C, wherein a helical conic segment of rubber 54 is applied to the ring stud 7. With the configuration of FIG. 2C, the inherent damping properties of rubber provide an advantage by absorbing energy from vibrations that would otherwise be transmitted through the variable geometry system. In addition, the rubber material is resistant to breakage and is insulated from the hot casing 37 while the engine is running, at the interface between the stand-off pad 23, 24 and 25 and the casing 37. Although the purpose of the stand-off pad is to keep the unison ring centered about the engine centerline, the present invention utilizes the insulating properties of the stand-off pad by having the stand-off pad provide a physical boundary between the case 37 and the rubber damper, consequently insulating the rubber from the casing 37.

Figure 2F:
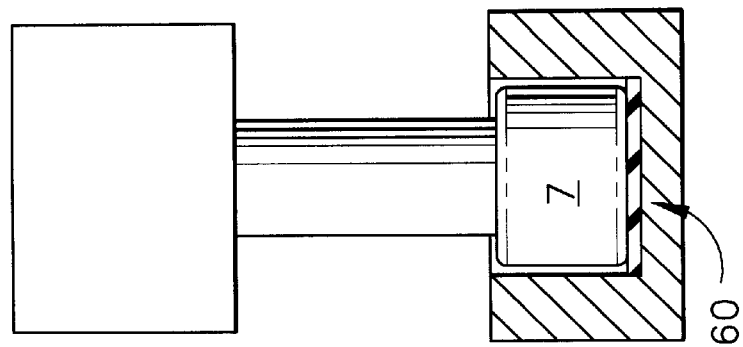
Figure 2E:
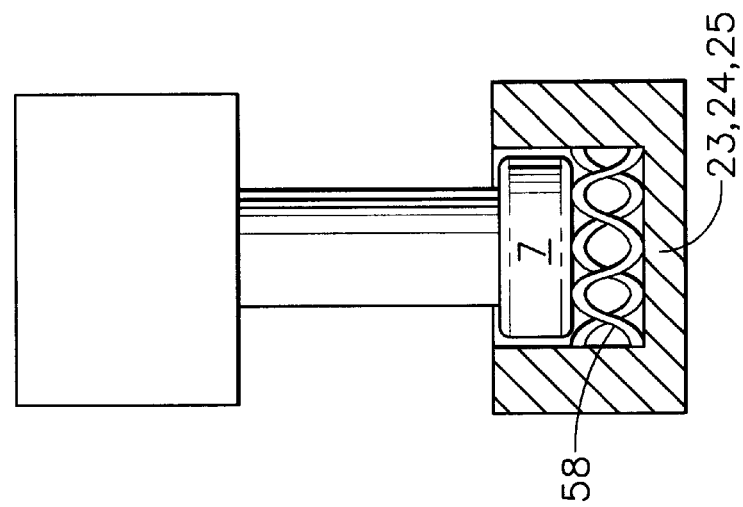
Figure 2D:
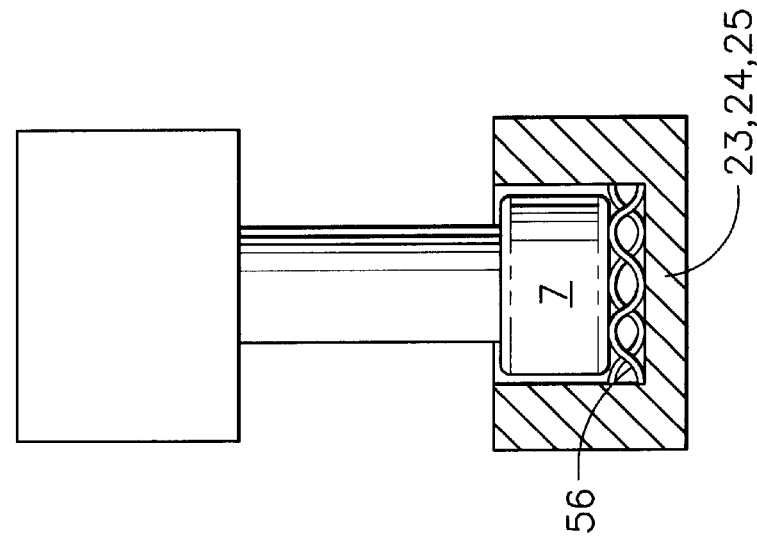

FIG. 2D illustrates an embodiment wherein a thin washer spring 56 is embedded into the stand-off pad, with that section shown enlarged. With this configuration, the springs 56 can be integrated into the stand-off pad 23, 24, and 25 of FIG. 1, for interchangeability advantages.

In yet another embodiment, illustrated in FIG. 2E, a wide washer spring 58 is embedded into stand-off pad 23, 24 and 25. In this embodiment, springs 58 can be integrated into the stand-off pads during assembly. Since spring 58 is wider than spring 56 of FIG. 2D, stand-off pad wear will have less effect on spring load in the embodiment of FIG. 2E.

FIG. 2F proposes a thin elastomeric insert 60 embedded into stand-off pad 23, 24 and 25. One advantage of this embodiment is that the inserts 60 can be integrated into the stand-off pads during assembly. The elastomeric insert 60 is contained within its location and provides advantageous damping properties by absorbing energy from vibrations that would otherwise be transmitted through the variable geometry system.

Figure 2G:
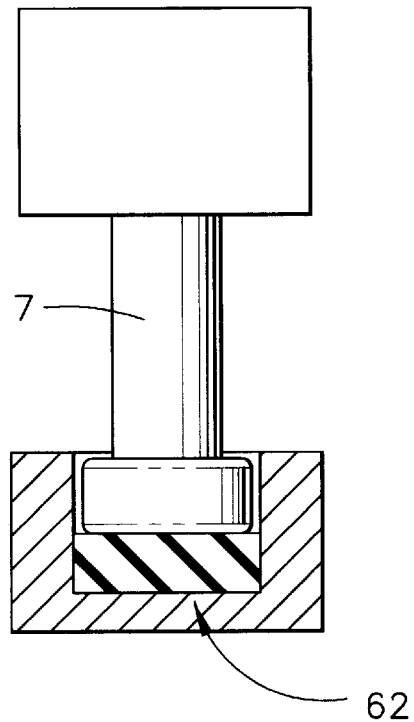

Another alternative embodiment is illustrated in FIG. 2G. FIG. 2G illustrates a wide elastomeric insert 62 embedded in stand-off pad 23, 24, 25. Again, the elastomeric pad 62 is contained and can be integrated into the stand-off pads. Since elastomeric insert 62 is wider than elastomeric insert 60 of FIG. 2F, stand-off pad wear will have less effect on radial load and damping in the embodiment of FIG. 2G.

Figure 2H:
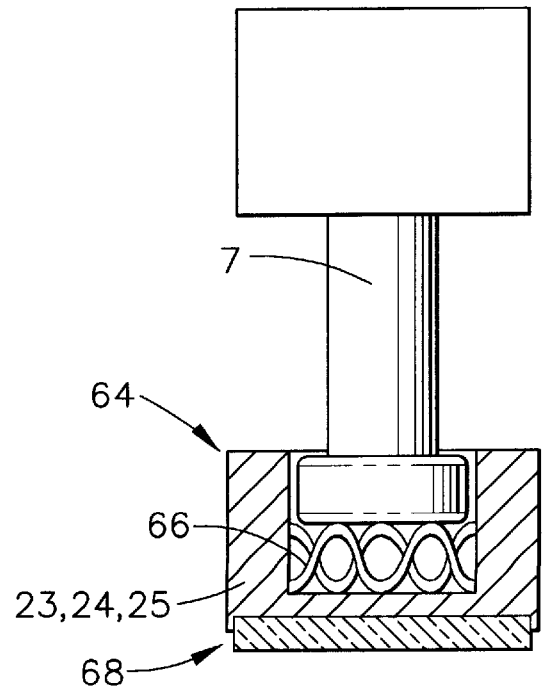

In the embodiment illustrated in FIG. 2H, a metallic stand-off pad 64 is proposed. The metallic stand-off pad 64 protects the casing 37 from spring 66 contact should the said spring penetrate through the stand-off pad 23, 24, 25 in FIG. 1. A composite rub surface 68 is added at the interface between the stand-off pad 23, 24, 25, and casing 37 in FIG. 1, to minimize wear at said stand-off pad and casing interface.

While multiple embodiments of the present invention have been shown and described herein, it will be obvious to those skilled in the art that such embodiments are provided by way of example only. Numerous variations, changes, and substitutions will now occur to those skilled in the art without departing from the invention, and those skilled in the art will recognize that the principles of the present invention could be easily adapted or modified to achieve goals in various arrangements. Accordingly, it is intended that the invention be limited only by the spirit and scope of the appended claims.

What is claimed is:

1. A method of extending service life of variable geometry components, including variable geometry rings, in an engine system by minimizing relative motion incurred from engine vibrations, the method comprising the steps of:

de-tuning the variable geometry rings from resonant engine vibrations;

providing compressive spring means to load the variable geometry rings in a radial direction; and introducing damping means to absorb impact from relative motion incurred by engine vibrations and to minimize said relative motion from being transmitted through the variable geometry components.

2. A method as claimed in claim 1 further comprising the step of locating a compressive spring between the variable geometry rings and stand-off pads.

3. A method as claimed in claim 1 wherein said damping means comprise frictional damping means.

4. A method as claimed in claim 1 wherein said damping means comprise independent radial damping means.

5. A method of extending service life of variable geometry components, including variable geometry rings, in an engine system by minimizing relative motion incurred from engine vibrations, the method comprising the steps of:

providing compressive spring means to load the variable geometry rings in a radial direction to de-tune the rings from resonant engine vibrations; and introducing damping means to absorb impact from relative motion incurred by engine vibrations and to minimize said relative motion from being transmitted through the variable geometry components.

6. A method as claimed in claim 5 further comprising the step of locating a composite element between the variable geometry rings and stand-off pads, said stand-off pads for positioning the variable geometry rings about an engine centerline.

7. A method as claimed in claim 6 wherein the composite element comprises a compressive spring and damping means.

8. A method as claimed in claim 7 wherein the damping means comprises frictional damping by forcing contact between the stand-off pad and an engine casing.

9. A method as claimed in claim 7 wherein the damping means comprises independent radial dampers.

* * * * *